United States Patent [19]
Hadeishi

[11] 3,811,778
[45] May 21, 1974

[54] ISOTOPE-SHIFT ZEEMAN EFFECT SPECTROMETER

[75] Inventor: Tetsuo Hadeishi, Berkeley, Calif.

[73] Assignee: The United States of America as represented by the United States Atomic Energy Commission, Washington, D.C.

[22] Filed: Feb. 28, 1973

[21] Appl. No.: 336,579

[52] U.S. Cl. .................................... 356/85, 356/96
[51] Int. Cl. ........................... G01j 3/30, G01j 3/42
[58] Field of Search ........................ 356/85, 86, 96

[56] References Cited
UNITED STATES PATENTS
3,676,004   7/1972   Prugger et al. ..................... 356/87

OTHER PUBLICATIONS

"Hyperfine Zeeman .... for Mercury"; Hadeishi et al.; Science; Vol. 174; 22 Oct. 1971; pp. 404–407.

Primary Examiner—Vincent P. McGraw
Attorney, Agent, or Firm—John A. Horan; Leonard Belkin

[57] ABSTRACT

Apparatus and method employing a beam containing specific Zeeman components for rapidly and accurately detecting the presence of trace amounts of a specific biologically dangerous metal element, such as Hg, that contaminates a host substance, such as food. In one embodiment for detecting Hg in fish, the apparatus comprises first means for heating a fish sample containing mercury to 950°C to form a vapor, second means for transmitting a focused light beam through the vapor in the form of light spectra produced from a mercury isotope in a magnetic field parallel to the light spectra, said spectra containing 2537 A light having specific Zeeman components that are equally scattered and differentially absorbed by the Hg in the vapor, comprising a circularly polarized $\sigma^-$ monitoring component that is attenuated by absorption by the mercury in the vapor an amount corresponding to the amount of mercury in the sample and a circularly polarized unabsorbed $\sigma^+$ reference component, said beam then being transmitted through a circular polarization selector for alternately periodically transmitting the respective components passing through the vapor, and a filter for passing only the 2537 A from the transmitted light beam to means for detecting said remaining components after the beam is so transmitted, as a measure of the mercury in the sample. In practice, a rotating quarter (¼ λ) plate and a linear polarizer having a 2537 A filter alternately periodically transmits the respective components to a single photomultiplier for providing a light-weight, portable detector.

1 Claim, 4 Drawing Figures

ISOTOPE-SHIFT ZEEMAN EFFECT SPECTROMETER

CROSS-REFERENCE TO RELATED APPLICATIONS

"Zeeman Effect Absorption Spectrometer", Ser. No. 288,801, filed Sept. 13, 1972 by Tetsuo Hadeishi.

BACKGROUND OF THE INVENTION

This invention was made in the course of, or under a contract with the United States Atomic Energy Commission with support by the RANN Division of the National Science Foundation.

In the field of environmental research, it is desirable to detect trace metal element contaminants, such as mercury, arsenic, lead, and cadmium in basic life sustaining substances, e.g., air, water, soil, and/or other substances derived therefrom, such as fish and meat, since these contaminants are biologically dangerous to animal and/or human health. Various means and methods have been proposed and used, but these have involved prior chemical separation of the contaminant from the host. It is particularly advantageous to provide a quick, inexpensive and accurate method and apparatus for achieving the desired detection in the parts per billion range in a few seconds without prior chemical separation of the mercury from the host substance.

The problems of the prior art methods and apparatus appear to have been largely overcome by the invention that is described in my co-pending application, AEC Case No. S-40,574, entitled, "Zeeman Effect Absorption Spectrometer," wherein I describe apparatus for the analysis, detection and comparison of two separate beams containing reference and monitoring components resulting from the splitting of a single focused beam transmitted through a vaporized sample of fish containing Hg for rapidly, inexpensively and accurately detecting the mercury in the fish without the prior chemical separation of the mercury therefrom. However, the apparatus covered in the co-pending application just mentioned for analyzing, detecting and comparing the two separate beams containing the reference and monitoring components remaining in the transmitted beam after splitting the same, requires, in one embodiment, separate means responsive to each beam, such as two separate photomultipliers for converting the two beams into electrical signals corresponding to the intensity of the split beams as a measure of the Hg in the vapor, or two separate beams recombined into a single beam transmitted to only one photomultiplier tube. Thus, while very effective in producing the desired results, it would be economically advantageous in reducing the cost and/or weight of the detector for commercial applications, to eliminate one of the two separate photomultipliers, as well as to eliminate two split beam paths, since they make an optical alignment difficult.

SUMMARY OF THE INVENTION:

This invention provides apparatus and method for alternately periodically passing a beam containing specific Zeeman components for alternately periodically detecting the components. More particularly this invention provides a Zeeman effect spectrometer for detecting a dangerous metal element in a host by alternately periodically splitting a beam containing specific Zeeman components into constituent parts corresponding in intensity to the intensity of the Zeeman components transmitted through a vapor of a host containing such a contaminant. To this end, this invention produces and detects a first reference component, and a second monitoring component such that the difference between the attenuation of the monitoring and reference components corresponds to the amount of the contaminant contained in a vaporized sample of the host. Specific Zeeman components comprise a circularly polarized $\sigma^-$ Zeeman component on top of the absorption peak of the Hg in a vapor formed from food, and a $\sigma^+$ component on the side of the absorption peak, these components being focused for transmission through the vapor, and a circular polarizer selector, comprising a rotating quarter wave retardation plate, and a linear polarizer, followed by a single 2537 A filter, whereby the two Zeeman components are detected as a measure of the Hg in the host.

Briefly stated in a preferred embodiment of this invention there is provided apparatus for the rapid and accurate detection of Hg in fish, comprising a furnace for rapidly vaporizing the fish to a temperature of at least 950°C, means having a $^{198}$Hg light source in a magnetic field for producing a focussed beam of light having a spectra containing two equally scattered and differentially absorbed circularly polarized Zeeman components, comprising a reference component and a monitoring component whose attenuation corresponds to the amount of the containment in the vapor, and a 2,537 A filter for providing a beam containing said reference and monitoring components passed by circular polarizer selector means for splitting said beam for detecting said two components as a measure of the amount of the contaminant in the host by alternately periodically transmitting them to a single means responsive thereto for producing a signal corresponding to the intensity thereof. To this end, a rotating quarter wave retardation plate and a linear polarizer followed by the single 2,537 A filter are used for alternate periodic transmission of the reference component and the remaining amount of the attenuated monitoring component to a photomultiplier detector after passing through the vaporized host containing the Hg.

It is a principle object of this invention, therefore, to provide a simple and effective method and apparatus for providing a beam containing two specific Zeeman components in such a way as to provide for the accurate and sensitive detection thereof by a single detector means, whereby the two specific Zeeman components can be alternately periodically detected for the rapid and accurate detection of a biologically dangerous metal element in a host by the differential absorption of the components in a vaporized sample of the host.

The above and further novel features and objects will appear more fully from the following detailed description when the same is read in connection with the accompanying drawings of one embodiment, and the novel features will be particularly pointed out in the appended claims.

BRIEF DESCRIPTION OF THE DRAWINGS

In the drawings where like elements are referenced alike.

DESCRIPTION OF PREFERRED EMBODIMENT

This invention is useful in rapidly and accurately detecting trace elements in the parts per billion range directly from a host material in a few seconds without prior chemical separation, and in providing a portable spectrometer that is useful in the field of environmental research for detecting and measuring specific biologically dangerous metal elements, such as mercury in fish, and the like. However, as will be understood in more detail hereinafter, the principles of this invention are broadly useful in detecting a wide variety of trace elements, such as mercury, arsenic, lead and cadmium, in a wide variety of hosts, comprising the natural life sustaining substances of air, water and soil, and/or the substances derived therefrom. While the apparatus and method of this invention have been used primarily in the field of environmental research, the principles thereof are also being used or actively pursued commercially, for example, for the portable field detection of Hg in various kinds of fish.

In this regard, the wide-spread use of this invention may materially enhance the quality of the environment of mankind by providing a tool for identifying high levels of specific trace metal elements in particular seas and inlets thereto, since often such elements are taken up in a food chain and concentrated in increasing amounts in particular species, such as fish that are indigenous to particular areas, or that have known paths of migration. Thus, this invention might be useful in helping to identify or control unknown sources of these trace elements in the seas and its inlets. Additionally, the principles of this invention can be directly applied to detecting contaminants in air, water and soil as will be understood in the art.

Figure 1:
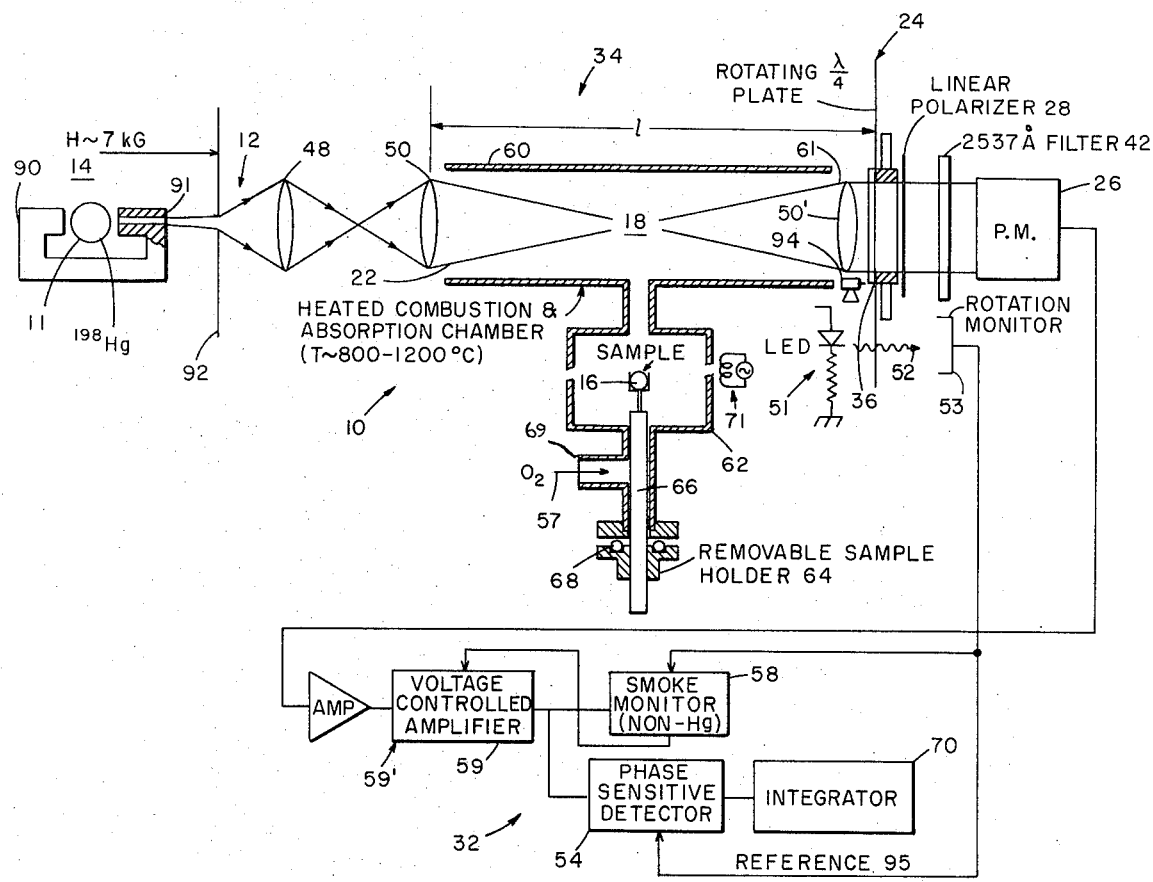
FIG. 1 is a partial cross-section of one embodiment of the apparatus of this invention.

Referring to FIG. 1, in one preferred embodiment, the apparatus 10 of this invention transmits a light spectra 12 in a magnetic field 14 parallel to the magnetic field to produce specific Zeeman components, comprising a reference component and a monitoring component for the contaminant to be detected in the sample 16, the latter forming a vapor 18 through which a focused beam 22 containing the transmitted spectra passes. The transmitted beam 22 then progresses through a rotating quarter wave retardation plate 36, a linear polarizer 28, and a 2,537 A filter 42 to form a time varying beam containing the respective reference and monitoring components for detection by a single photomultiplier 26, which produces output signals whose amplitudes correspond to the amount of the contaminant in the sample 16. To this end, the rotating quarter wave plate 36 and linear polarizer 28 alternately periodically transmit the respective reference and monitoring components through a single 2,537 A filter 42 to the photomultiplier 26, whereupon signal processing circuits 32 detect the signals from the photomultiplier 26 as a measure of the contaminant in the vapor 18. By amplifying the output signal from the photomultiplier tube 26 with a voltage controlled amplifier having a remotely controlled smoke monitor, the signal can be maintained free of error regardless of the amount of smoke in furnace 34, up to about 90 percent attenuation of the light in beam 22. For convenience, the signal from the photomultiplier 26 can be synchronously detected with a reference derived from the alternating periodic cycle of a circular polarization selector 24, formed by the rotating quarter-wave plate 36 and linear polarizer 28. As described in my article in Applied Physics Letter, Vol 21, No. 9, November 1972 on p. 438, signal processing circuits, such as circuit 32, perform various functions to get the correct information that leads to the accurate measurement of the amount of a trace element in the host material. Thus, the circuits 32 provide a signal processing system, which includes element 59', e.g., 58, 59 and 70, as described in more detail hereinafter.

Figure 2:
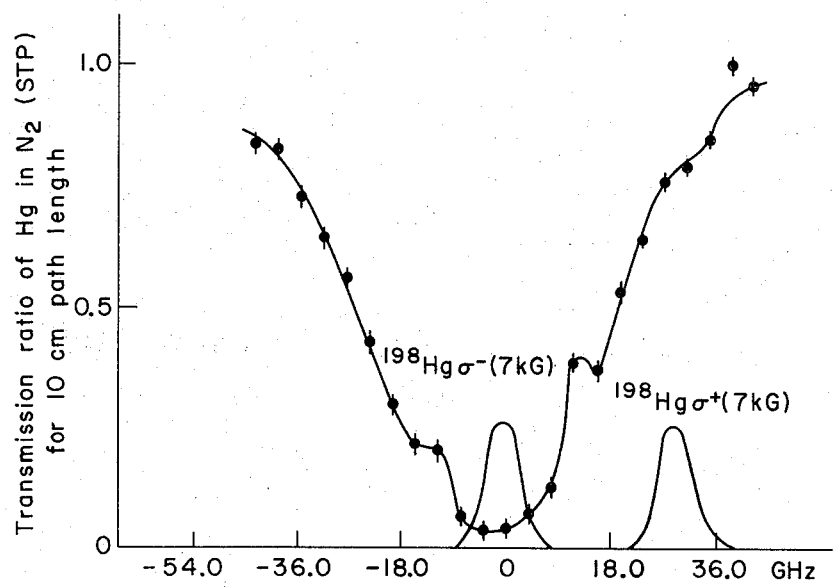
FIG. 2 is a graphic illustration of a Zeeman shift line profile of $\sigma^+$ and $\sigma^-$ of $^{198}$Hg in 7 kG superimposed on an absorption profile of naturally occuring mercury in 1 atmosphere (STP) of $N_2$.
Figure 2A:
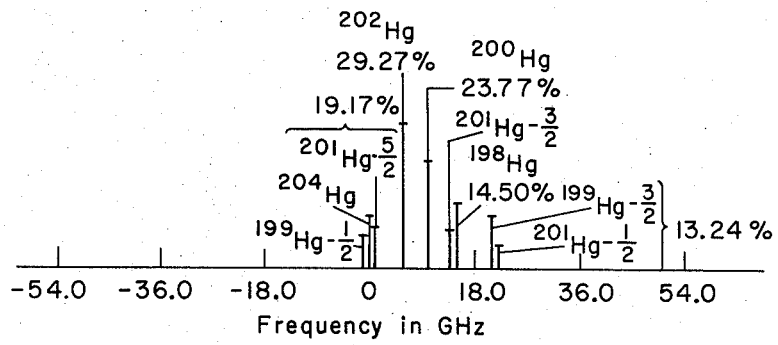
FIG. 2a is a graphic illustration of the frequency of various Hg isotopes.

In the embodiment of FIG. 1 for detecting Hg in vapor 18, a $^{198}$Hg source 11 in a 7 kG magnetic field 14 transmits a light spectra containing 2,537 A wavelength light having a $\sigma^-$ Zeeman component on top of the absorption peak profile of the Hg in vapor 18 and a $\sigma^+$ Zeeman component on the side of this absorption peak profile, as shown in FIG. 2, and published in Applied Physics Letter, Vol. 21, 438 (1972) by Tetsuo Hadeishi, the Hg absorption peak and and profile being determined by magnetic scanning techniques. A rotating quarter-wavelength plate 36 and linear polarizer 28 select the $\sigma^+$ and $\sigma^-$ components by receiving the spectra transmitted through the vapor 18, and alternately periodically transmitting the $\sigma^+$ component remaining and the $\sigma^-$ monitoring component through a 2,537 A filter 42 to a photomultiplier 26 having an amplified output for detection in circuit 32. Since the 2,537 A wavelength light in the transmitted spectra, which is focused into beam 22 by lenses 48, 50 and 50' is passed from the beam 22 by a single 2,537 A wavelength filter 42 that transmits the reference and monitoring components, the photomultiplier output contains information that corresponds to the amount of the Hg contaminant in the vapor 18. For convenience, a source 51 transmits $\sigma^+$ and $\sigma^-$ electromagnetic radiation 52 to rotation monitor 53 every time the plate 36 rotates 180° to produce a suitable reference for a phase-sensitive detector 54 in the detection circuit 32. FIG. 2a illustrates the frequency of various Hg isototopes.

Figure 3:
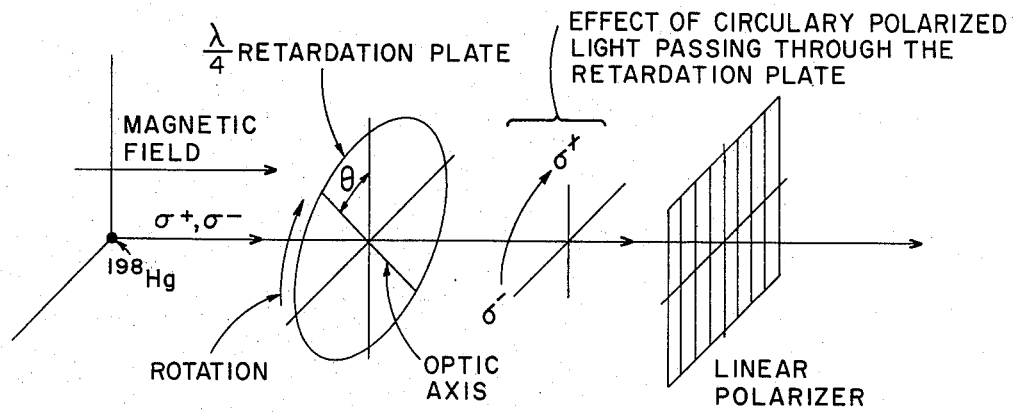
FIG. 3 is a partial three dimensional view of the rotating ¼λ retardation plate of FIG. 1.

The quarter-wave retardation plate 36, which is illustrated in FIG. 3, was made of x-cut crystal in a disk about 3 mil thick and ½ inch in diameter that was optically polished to better than 1/10 of a wave length. The thickness of the quartz used was such that the phase angle δ between the ordinary and extra-ordinary rays at 2,537 A is given by $$\delta = 2\pi/\lambda d\,(N_0 - N_E) = (15)\,\pi/4$$

where $d$ is the thickness, $\lambda$ the wave length and $N_o$ and $H_E$, respectively, the index of refraction for ordinary and extra-ordinary rays. The optic axis of the retardation plate 36 was monitored by the rotation monitor, which is described hereinafter in more detail in connection with FIG. 1.

In the embodiment of FIG. 1, where the described $^{198}$Hg source 11 in a 7 kG magnetic field 14 is used for detecting a Hg contaminant in sample 16, it has been found that the scattering and absorption of the $\sigma^+$ and $\sigma^-$ components in the focused beam 22 by the nonmercury vapor 18, varies slowly in the vicinity of 2,537 A, so that the amount of scattering or absorption by the nonmercury vapor is the same for both the $\sigma^+$ and $\sigma^-$ components. In this regard, these two components are only about 0.5 of a wave number apart, the $\sigma^+$ and $\sigma^-$ components only being separated by 0.5 cm$^{-1}$. Thus, these components can be selectively detected by the retardation plate-linear polarizer combination described hereinafter in more detail. If an ordinary spectrometer was used, it would require an extremely high dispersive spectrometer of 3 meters length. On the other hand, in accordance with this invention, since these $\sigma^+$ and $\sigma^-$ components are differentially absorbed by the Hg contaminant in the vapor 18, as illustrated in FIG. 2, these components from this $^{198}$Hg source 11 provide an accurate and sensitive Zeeman reference component and an accurate and sensitive Zeeman monitoring component whose attentuation in vapor 18 corresponds to the amount of the Hg contaminant in the vapor 18 as long as the smoke in furnace 34 does not block the light in beam 22. As will be understood herein, this smoke is reduced in accordance with this invention, although it may be up to about 90 percent attenuation of the light in beam 22 by nonmercury absorption or scattering, since a smoke detector controls the amplified photomultiplier output as understood in more detail hereinatter.

Ordinarily, a tuna-fish sample 16 produces smoke, but a sufficient volume in a furnace 34 that forms the vapor 18, and a high enough temperature therein, tends to reduce the smoke to acceptable attenuation levels well below those that completely block the beam 22. Suitable temperatures are about 950°C and higher in a volume of several cc's, depending on the sensitivities required, since a larger furnace volume, while tending to reduce smoke, also tends to decrease sensitivity. Also, the described apparatus 10 of FIG. 1 heats the sample 16 quickly in a few seconds in a gas flow 57, whereby the presence of smoke in the furnace 34 is reduced for detecting Hg in fish with sensitivities down to 1 or more parts per billion in a few seconds with a detection circuit 32 for the amplified signals from photomultiplier 26. One such circuit is the circuit 32 of FIG. 1, which for convenience has a smoke monitor 58 for controlling the gain of a voltage-controlled amplifier 59 for amplifying the output of photomultiplier 26 in accordance with a predetermined constant.

In operation, this constant is easily determined by calibrating the appratus 10 against vapors 18 containing known predetermined amounts of Hg and nonmercury components, or alternately using the constant described on page 4 of the theoretical discussion thereof by the inventor in University of California, Lawrence-Berkley Laboratory Report LBL-751, dated March 1972, and entitled, "Isotope Shift Zeeman Effect Trace Element Detection: An Application of Atomic Physics to Environmental Problems," under AEC Contract No. W-7405-eng-48, published in Nov. issue of Applied Physics Letter, Vol. 21, page 438, 1972.

This report, which is incorporated by reference herein also discusses on page 5 thereof, the theory of the decomposition of the sample 16 at a constant rate and its constant flow rate out of the absorption tube chamber 60 of the furnace 34 where the focused uniform cross-section portion 61 of the beam 22 passes through the vapor 18. In operation, these constants are achieved with a large gas flow calibrated against a known predetermined sample containing predetermined amounts of the containment to be detected, e.g., Hg.

In one sequence of operation for the apparatus 10 of FIG. 1 with the described $^{198}$Hg source 11 for the detection of Hg in a tuna fish sample 16, a combustion chamber receives a sample 16 in a holder 64 by biasing rod 66 thorugh suitable seals 68 in a combustion chamber 62 at 950°C or more, while a suitable gas flow through duct 69 circulates gas into the chamber 62 to maintain a sufficiently high level of vapor 18 and a sufficiently low level of smoke in absorption tube chamber 60 to pass the beam 22 to the photomultiplier 26 from the $^{198}$Hg isotope source 11, which is advantageously at 300° in a magnetic field of 7 kG, the source 11 producing a $\sigma^-$ circularly polarized monitoring Zeeman component, which is attenuated by Hg absorption in the vapor 18 an amount corresponding to the amount of the Hg in the sample 16, and a $\sigma^+$ circularly polarized reference Zeeman component that passes through the vapor 18 without being attenuated by Hg absorption and is alternately periodically detected with the $\sigma^-$ component by photomultiplier 26 whose output signal amplitudes are detected in analyzing circuitry 32.

Advantageously, a combustion chamber 62 in a furnace 34 is provided as the part of the secondary of a transformer 71 for quickly heating a wide variety of samples 16 at a constant rate in a uniformly constant large gas flow 57 with a long operating lifetime, it having been found that the operating lifetime is reduced considerably with conventional nichrome heating elements at from 900°C to 1,000°C or more. While actual measurements have been made for Hg in samples comprising, tuna fish and other solids that have been vaporized in a gas flow 57 in the combustion chamber 62 of the apparatus 10 of FIG. 1, other combustion chambers, e.g., a vacuum combustion chamber, containing Hg or other contaminants, such as arsenic, lead or cadmium, can be used in accordance with the principles of this invention, whether in a vapor 18 formed from food or other life sustaining substances such as soil, water and air, provided that the light source 11 produces the required Zeeman components, the circular polarization selector 24 separates these components, the photomultiplier 26 is sensitive enough, and the furnace heats a sufficient amount of the sample to a high enough temperature in a sufficient volume that does not contain too much smoke.

The following are examples of this invention:

EXAMPLE I

An organic sample of orchard leaves containing 0.16 ppm mercury as determined by various standard methods was placed in a heated furnace (T ~ 800°C to 1,200°C) in the presence of $O_2$ blown into the furnace at a constant rate to transfer the sample to an absorption tube and to decompose it at a constant rate verified against a control vapor of HgCl to calibrate the apparatus of FIG. 1.

A $^{198}$Hg source produced a light spectra in a 7 kG magnetic field provided by a dipole magnet 90 having north and south poles 11 mm apart. The light spectra parallel to the magnetic field 14 provided by the magnet 90 was transmitted through a 2.5 mm hole 91 drilled through a magnet by EDM (Election Discharge Machining), this light spectra containing 2,537 A wavelength light having a circularly polarized $\sigma^-$ Zeeman monitoring component centered on the absorption peak profile of 2,537 A light by Hg, and a circularly polarized $\sigma^+$ reference Zeeman component on the side of the absorption peak profile. The shape of the 2,537 A light profile was checked with a Fabry-Perot interferometer as well as by Bitter's magneto-optical scanning method, as described in University of California, Lawrence Berkley Laboratory Report UCRL-20643, entitled "Hyperfine-Zeeman Effect Atomic Absorption Spectrometer for Mercury," by the inventor herein. A conventional aperture plate 92 was used.

The transmitted light spectra was focused by a first lens at the center of an absorption tube and was received by another lens that made the light beam uniform in cross-section and parallel.

The transmitted beam containing the transmitted light spectra, comprisng the 2,537 A light with Zeeman components remaining, was then transmitted through a rotating one-quarter wavelength plate that alternately periodically selected and split the transmitted beam into two respective beams containing respectively the transmitted $\sigma^+$ reference component and the $\sigma^-$ monitoring component remaining after absorption by the Hg in the vapor in the absorption chamber, said transmission corresponding to the orientation of said plate relative to said beam. To this end, the plate was rotated by a constant speed motor 94 to transmit one of the two beams every time the plate rotated 180°.

The respective beams were then transmitted through a linear polarizer and a 2,537 A wavelength light filter to remove all except the 2,537 A wavelength light from the two beams without attenuating the intensity of the $\sigma^+$ and $\sigma^-$ Zeeman components. This combination thus provided a periodically time varying circular polarization selector. The intensity of the components remaining was then alternately periodically detected by a single photomultiplier that produced electrical signals in the form of outputs whose amplitudes corresponded to the intensity of the components remaining. These signals were thus detected as a measure of the Hg in the sample.

For purposes of sensitivity and control, the detection was performed by a first amplifier and a voltage controlled amplifier in series, the latter being controlled by a monitor of the smoke in the absorption chamber, and transmitting the amplified signals to an integrator through a phase-sensitive detector having a rotation reference 95 responsive to the rotation frequency of the rotating plate.

The integration output indicated a Hg contaminant of 0.20 ± 0.04 -pm in the sample from integrator 70.

EXAMPLE II

Example I was repeated with a fish protein sample, and the sample was measured to contain 0.72 ± 0.05 ppm Hg, as confirmed by standard wer chemistry methods.

EXAMPLE III

Example I was repeated with a fish protein concentrate, and the sample was measured to contain 0.53 ± 0.01 ppm Hg, which compared to a determination of 0.59 ppm by standard wet chemistry methods.

The above and further repeated examples are compared in the following Table I, wherein the results in accordance with this invention are tabulated in the last right hand column:

TABLE I

Comparison of isotope-shifted Zeeman-effect technique to other conventional methods

| Sample source and identification | Lab where tested | Method used | Their results (ppm) | Our results in ~10 sec (ppm) |
|---|---|---|---|---|
| National Bureau of Standards Reference 1571 (orchard leaves) | NBS | Spark source mass spectrometer, neutron activation, chemical analysis with atomic absorption | 0.2 | 0.20±0.04 |
| National Marine Fisheries Service, Seattle, Washington Sample 614-1200 (fish protein concentrate) | NMFS | Wet chemistry | 0.72 | 0.72±0.05 |
| Sample 628-0400 (fish protein concentrate) | NMFS | Wet chemistry | 0.59 | 0.53±0.01 |
| Sample S-433 (wet cod) | Phoenix Mem. Gulf Atomic NMFS | Neutron activation Neutron activation FDA method (wet chem.) | 0.49 0.48 0.48, 0.45, 0.58 | 0.45±0.02 |
| Sample S-430 (wet halibut) | Phoenix Mem. Gulf Atomic NMFS | Neutron activation Neutron activation FDA method (wet chem.) | 0.12 0.13 0.10, 0.14, 0.09 | 0.14±0.02 |
| National Canners Association Aceton powder tuna (white meat) | NCA | Wet chemistry | 2.48 | 2.08±0.02 |
| Univ. of California at Davis UCD Control mare liver | LBL LBL | X-ray fluorescence Neutron activation | 12.0±2.0 11.0, 14.0 | 10.0±0.3 |

This invention has the advantage of providing a simple, inexpensive and light weight commercial device for rapidly detecting trace amounts of dangerous metal elements that contaminate vital life sustaining substances. In one embodiment, specific apparatus is provided for alternately periodically splitting a beam containing specific light spectra for detecting specific reference and monitoring Zeeman components in a single photomultiplier, as a measure of the amount of the contaminant in a sample.

What is claimed is:

1. Apparatus for rapidly and accurately detecting the presence of trace amounts of a specific biologically dangerous metal element Hg that contaminates a host, comprising:

a. means for generating from a single separated isotope of said element a reference light spectra in the presence of a sufficiently strong magnetic field to produce specific circularly polarized $\sigma^+$ and $\sigma^-$ Zeeman components of said spectra;

b. means for rapidly heating a sample of said host to produce a vapor containing said host and said contaminant;

c. means for transmitting said reference light spectra through said vapor to effect differential absorption therein so that the two specific circularly polarized Zeeman components are equally scattered by said vapor and differentially absorbed thereby, said contaminant effecting the absorption of one of said components in accordance with the amount of said contaminant in said host;

d. rotating one-quarter wavelength plate means that selectively transmits said two specific circularly polarized Zeemans components periodically alternately in accordance with the rotation of said plate after said components are transmitted by said vapor;

e. linear polarizer means for receiving and transmitting said two specific circularly polarized Zeeman compnents that are periodically alternately transmitted by said one-quarter wavelength plate means; and f. means for directly detecting said two specific diffentially absorbed Zeeman components, which comprises photomultiplier means for detecting said two specific circularly polarized Zeeman components that are transmitted by said rotating one-quarter wavelength plate means, the same being means that selectively transmits said components periodically alternately in accordance with the rotation of said plate means, said photomultiplier means for measuring said transmitted components as a measure of said contaminant in said host.

* * * * *